T. W. MAYSON & J. EDGAR.
WHEEL FENDER.
APPLICATION FILED OCT. 31, 1908.

944,199.

Patented Dec. 21, 1909.

Witnesses:

Inventors
Thomas W. Mayson
John Edgar
By James L. Norris
Atty.

UNITED STATES PATENT OFFICE.

THOMAS WILLIAM MAYSON AND JOHN EDGAR, OF AUCKLAND, NEW ZEALAND.

WHEEL-FENDER.

944,199.  Specification of Letters Patent.  Patented Dec. 21, 1909.

Application filed October 31, 1908. Serial No. 460,527.

*To all whom it may concern:*

Be it known that we, THOMAS WILLIAM MAYSON and JOHN EDGAR, subjects of His Majesty the King of the United Kingdom of Great Britain and Ireland, residents of Auckland, in the Provincial District of Auckland and Dominion of New Zealand, have invented Improvements in Wheel-Fenders, of which the following is a specification.

This invention relates to improvements in wheel fenders for tram cars, motor cars, and similar vehicles.

The invention consists in providing an extendible frame operated by two or more lazy tongs actuated by spiral springs which are brought into action by the agency of a ratchet and pawl connection, the whole of which is attached to the under side of the front of the car fitted with it.

The particulars of the attachment and its parts are given hereunder.

Figure 1:
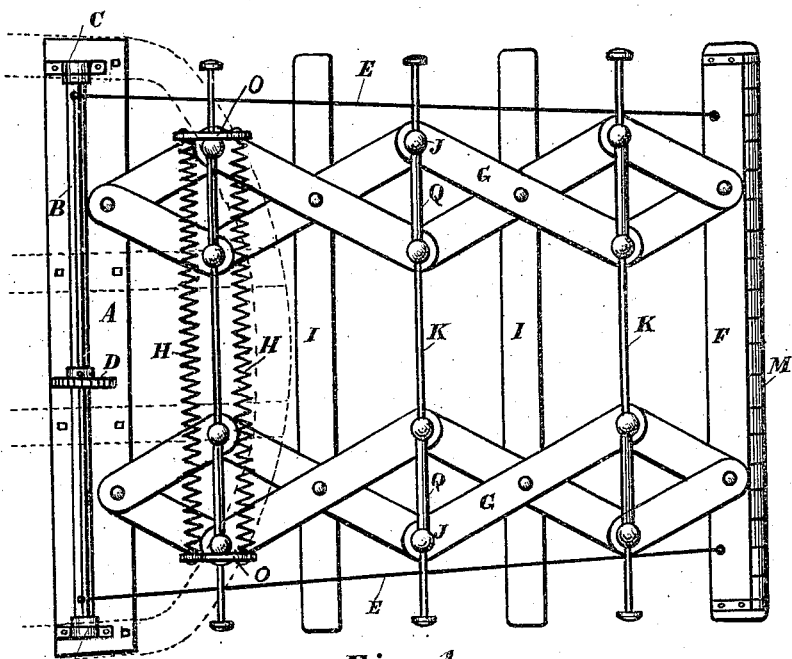
Figure 2:
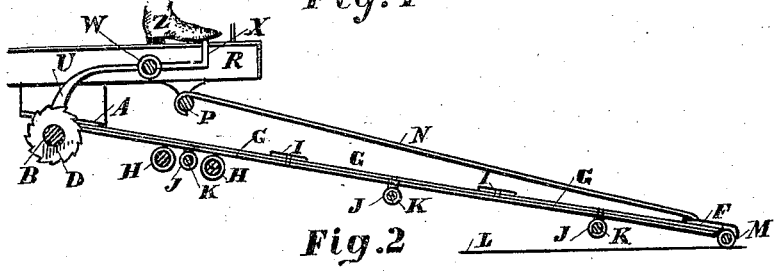
Figure 3:
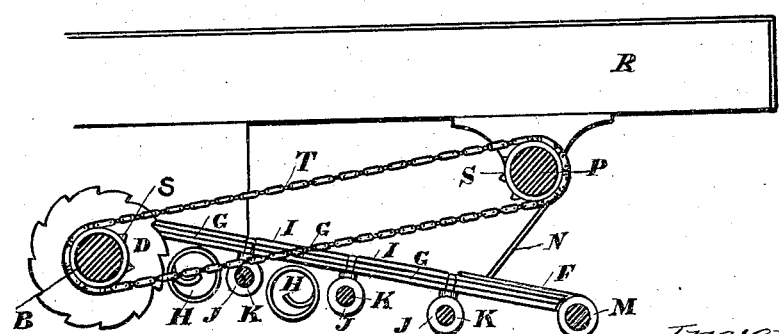

The accompanying drawing shows three figures, of which—Figure 1 is a bottom view of the fender in its extended position, the catcher shown in Fig. 2 and the gear element shown in Fig. 3 being omitted for the sake of clearness of illustration. Fig. 2 is a central longitudinal sectional view of the fender showing the extended relation of the parts. Fig. 3 is a longitudinal section showing the various parts wound and folded up and also the winding gear for operating the frame and catcher proper.

The upper cross beam A has a shaft B fitted to it by bearings C. This shaft B is provided to carry a ratchet D and also to wind up the whole frame by the cords E which connect the shaft B to the lower or front cross bar F. Intermediate to the upper cross beam A and lower cross bar F lazy tongs G are provided and connected thereto. Spiral springs H are fitted crosswise on the lazy tongs G and operate to cause the extension of the same. Intermediate cross stays I are connected to the intersecting portions of the arms of the lazy tongs for strengthening purposes.

In between the different cross stays eyes J are riveted to the lazy tongs G and sliding rods K are passed through said eyes J for the purpose of keeping the frame straight and rigidly in position when extended. The ends of the springs H are connected to lugs or extensions O on a pair of suitably located eyes J as is shown in Fig. 1. Rollers M are fitted to the front of lower cross bar F and are provided to run and in part carry the weight of the frame over the road or way L. The catcher proper N is made of suitable material, preferably canvas and is stretched above the frame and suitably secured thereto in such a way that when the frame as a whole is folded up the catcher proper N is wound around a shaft P connected to the under part of the tram car R. The upper cross beam A is fixed to the underside of the tram car R as shown on the drawing. Sprocket wheels S are fitted to the shafts B and P and the chain T connects the two wheels as shown in Fig. 3. Shaft B can be turned by any form of power, hand or otherwise and when so turned rotates the sprocket wheels S. A pawl U engages the ratchet D and is fulcrumed at W being operated to release the ratchet D by pressure on its head X in any suitable manner, as for example, by the operator's foot Z.

The upper cross beam A being fixed to the under side of the car R and the frame being folded as shown in Fig. 3 while the car is being propelled along at a more or less rapid rate when an object such as a man or dog or the like gets suddenly in front of the car the driver or motorman on the car presses the head X of the pawl U with his foot or otherwise so that the ratchet D is released and the lazy tongs G are then immediately extended by the springs H to their full length, at which time the rollers M rest on the road or way L, while the catcher proper N is stretched above the frame as shown in Fig. 2 in such a way that the object is at once either caught up on the catcher proper N or thrown to one side out of the path of the passing car. The object having been taken up and removed or placed out of danger, the frame is folded up beneath the under part of the car in readiness to be again extended when the necessity for its use arises.

The rods K are mounted with sleeves Q between the eyes J as shown on Fig. 1 for the purpose of preventing the rods K from sliding too far and to check too great an expansion of the lazy tongs G.

The rotation of the shaft B in folding the fender causes the simultaneous rotation of the shaft P through the intermediary of the sprockets S and the chain T, and the shaft B at the same time that the fender is being folded winds up the canvas catcher N.

Having fully described our invention what we desire to claim and secure by Letters Patent is:—

1. In a wheel fender, in combination, a pair of lazy tongs, frame parts associated therewith, retractile coil springs connecting the lazy tongs and having a normal tendency to extend the same and releasable means for holding the lazy tongs in folded relation.

2. In a wheel fender, in combination, a pair of lazy tongs, frame parts associated therewith, retractile coil springs connecting the lazy tongs, a shaft, a cord connecting the shaft and one of the frame parts, a ratchet wheel on the shaft and a pawl engaging the ratchet wheel and serving thereby to maintain the lazy tongs in folded relation against the tension of the springs.

3. In a wheel fender, in combination, a frame comprising a set of lazy tongs, means for automatically extending the same, a flexible catcher arranged above the frame, a shaft for winding the catcher, means for moving the lazy tongs to a folded position and means at the same time for causing the operation of the shaft to wind the flexible catcher thereon.

4. In a wheel fender, in combination, a frame including a set of lazy tongs, springs tending normally to hold the lazy tongs extended, a shaft, a part secured at one end of the lazy tongs, a cord connecting the shaft and said part, a ratchet wheel on the shaft and a pawl in engagement with the ratchet wheel to thereby hold the lazy tongs against extensible movement under the tension of the springs.

5. In a wheel fender, in combination, a frame including a pair of lazy tongs, eyes provided at the terminations of the arms of the lazy tongs and forming the mutual pivotal connections of the arms, and rods slidably passed through the eyes.

6. In a wheel fender, in combination, a foldable and extensible frame, a flexible catcher disposed above the frame and connected thereto, means for folding the frame, and means for simultaneously taking up the catcher.

THOMAS WILLIAM MAYSON.
JOHN EDGAR.

Witnesses:
GEORGE WILLIAM BASLEY,
HILDA MAY FROUDE.